United States Patent
Manabe et al.

(10) Patent No.: US 6,674,500 B2
(45) Date of Patent: Jan. 6, 2004

(54) LIQUID CRYSTAL DISPLAY DEVICE WHEREIN LIQUID CRYSTAL INLET SHIELDED BY MEANS OF SHIELD PATTERN AND SECOND OUTER PERIPHERY WIRING

(75) Inventors: Atsuyuki Manabe, Fukaya (JP); Nobuko Fukuoka, Omiya (JP); Daisuke Miyazaki, Kamakura (JP); Hitoshi Hato, Yokohama (JP); Tetsuya Iizuka, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/388,541

(22) Filed: Mar. 17, 2003

(65) Prior Publication Data

US 2003/0179328 A1 Sep. 25, 2003

Related U.S. Application Data

(62) Division of application No. 09/654,454, filed on Sep. 1, 2000, now Pat. No. 6,570,639.

(30) Foreign Application Priority Data

Sep. 2, 1999 (JP) ............................................. 11-248852
Nov. 15, 1999 (JP) ............................................. 11-324264

(51) Int. Cl.$^7$ ..................... G02F 1/1333; G02F 1/1339; G02F 1/1341
(52) U.S. Cl. ..................... 349/110; 349/153; 349/156; 349/189; 349/190
(58) Field of Search ................................ 349/106, 110, 349/111, 153, 155, 156, 189, 190

(56) References Cited

U.S. PATENT DOCUMENTS

| | | | |
|---|---|---|---|
| 5,739,888 A | 4/1998 | Ogura et al. | 349/110 |
| 5,910,829 A | 6/1999 | Shimada et al. | 349/106 |
| 5,946,070 A | 8/1999 | Kohama et al. | 349/156 |
| 6,057,900 A | 5/2000 | Ono et al. | 349/106 |
| 6,304,308 B1 | 10/2001 | Saito et al. | 349/110 |
| 6,373,538 B2 | 4/2002 | Okumura et al. | 349/106 |
| 2001/0030722 A1 * | 10/2001 | Murade | 349/110 |

FOREIGN PATENT DOCUMENTS

| | | |
|---|---|---|
| JP | 8-278499 | 10/1996 |
| JP | 10-54991 | 2/1998 |
| JP | 11-95202 | 4/1999 |

* cited by examiner

*Primary Examiner*—Tarifur R. Chowdhury
(74) *Attorney, Agent, or Firm*—PIllsbury Winthrop LLP (57) ABSTRACT

A liquid crystal display device includes a pair of substrates, a liquid crystal material sandwiched between the pair of substrates, a shield area disposed on the outer periphery of a display area, and an outer edge sealing member disposed on the further outer periphery than the shield area and formed except for the liquid crystal inlet. Particularly, in this liquid crystal display device, a shield pattern comprising a resin of a predetermined thickness and a color filter thinner than the predetermined thickness coexist with each other on a plane in the shield area in the vicinity of the inlet.

4 Claims, 7 Drawing Sheets

LIQUID CRYSTAL DISPLAY DEVICE WHEREIN LIQUID CRYSTAL INLET SHIELDED BY MEANS OF SHIELD PATTERN AND SECOND OUTER PERIPHERY WIRING

CROSS-REFERENCE TO RELATED APPLICATIONS

This application is based upon and claims the benefit of priority from the prior Japanese Patent Applications No. 11-248852, filed Sep. 2, 1999; and No. 11-324264, filed Nov. 15, 1999, the entire contents of which are incorporated herein by reference.

This is a Divisional Application of U.S. application Ser. No. 09/654,454 filed Sep. 1, 2000, now U.S. Pat. No. 6,570,639 the entirety of which is hereby incorporated by reference.

BACKGROUND OF THE INVENTION

The present invention relates to an improvement of a shield structure in the vicinity of the inlet of liquid crystal for a liquid crystal display device.

A typical color liquid crystal display device is provided with an array substrate on which a plurality of pixel electrodes are disposed in a matrix form, a counter substrate opposing to this array substrate, and liquid crystal material sandwiched between the array substrate and the counter substrate. A liquid crystal cell is obtained by bonding the outer edges of the array substrate and the counter substrate by means of an outer edge sealing member formed so as to leave a liquid crystal inlet, by injecting liquid crystal material into a liquid crystal storage space through this liquid crystal inlet, and by sealing the liquid crystal inlet by means of an inlet sealing material after having filled the space with liquid crystal material. Further, the array substrate includes a color filter covering the surface of the substrate completely and transmitting light having a color component allocated to each of said plurality of pixel electrodes, a shield pattern formed in the shield area surrounding the display area, and a plurality of spacers formed on this color filter for providing a liquid crystal storage space between the array substrate and the counter substrate. That is, the array substrate and the counter substrate are spaced from each other by the height of these spacers.

Hereupon, the shield pattern is formed of a metallic film material such as chromium (Cr) or molybdenum-tungsten (MoW) or a resin material to shield light passing through the shield area. In particular, the resin can be used also as color filter or spacer. In this case, the color filter is formed of colored resin layers colored green, blue and red respectively. The shield pattern and the spacers are formed respectively of colored resin layers colored black. With respect to the shield pattern and the spacers, black color layers superimposed on the color filter can be formed simultaneously by means of a common patterning treatment using photolithography method.

However, when the shield pattern is formed like this, the substantial space between the array substrate and the counter substrate is narrowed due to the thickness of the shield pattern, what makes it difficult to inject liquid crystal material. Therefore, there is a problem of not being capable of completing the injection of liquid crystal material in a short time.

Further, it is also conceivable to form the colored layer of the color filter in the vicinity of the liquid crystal inlet of a blue-black color layer and use it as shield pattern. Although this method makes it easier to inject liquid crystal material, however, it leads to a deteriorated appearance that blue light is observed partially outside the display area corresponding to the plurality of pixel electrodes.

BRIEF SUMMARY OF THE INVENTION

The present invention has been made to solve the above-described problems, and has an object of providing a liquid crystal display device being capable of shortening the liquid crystal material injection time without deteriorating the appearance in the vicinity of the liquid crystal inlet.

According to the present invention, in a liquid crystal display device including a pair of substrates, a liquid crystal material sandwiched between the pair of substrates, a shield area disposed on the outer periphery of a display area, and an outer edge sealing member disposed on the further outer periphery than the shield area and formed except for the liquid crystal inlet, there is provided a liquid crystal display device, wherein a shield pattern comprising a resin of a predetermined thickness and a color filter thinner than the predetermined thickness coexist with each other on a plane in the shield area in the vicinity of the inlet.

According to this liquid crystal display device, since the color filter and the shield pattern are disposed so as to coexist on a plane in the shield area in the vicinity of the inlet, the liquid crystal injection path can be made larger than the case in which the shield area is covered only with the shield pattern. On the contrary, since the color of the color filter is not exposed wholly, the color of the color filter can be made quiet in this shield area. Therefore, the liquid crystal injection time can be shortened without deteriorating the appearance in the vicinity of the liquid crystal inlet.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, referring to the drawings, the first embodiment of the present invention will be described.

Figure 1A:
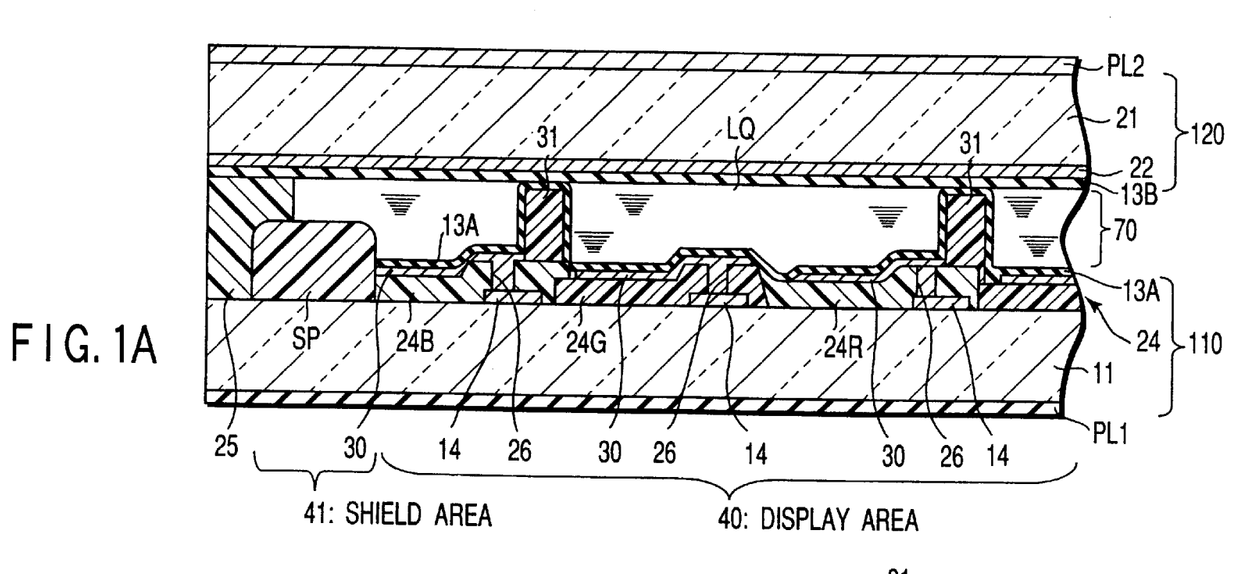
FIG. 1A is a sectional view showing the construction of a liquid crystal display device according to an embodiment of the present invention schematically.

As shown in FIG. 1A, the liquid crystal display device is provided with an array substrate 110 on which a plurality of pixel electrodes 30 are disposed in a matrix form, a counter substrate 120 opposing to this array substrate 110, and a liquid crystal layer 70 sandwiched between the array substrate 110 and the counter substrate 120.

The array substrate 110 includes a transparent substrate 11, switching elements 14 formed on this transparent substrate 11 corresponding to the plurality of pixel electrodes 30 respectively, color filter layers 24 (R, G, B) formed by covering the display area 40 including these pixel electrodes 30 and switching elements 14, a shield pattern SP formed so as to surround the display area 40 in which these pixel electrodes 30 and switching elements 14 are disposed and cover the shield area 41 of the transparent substrate 11, a plurality of columnar spacers 31 formed on the color filter 24, and an alignment film 13A formed by covering the plurality of pixel electrodes 30 totally.

The color filter 24 has a thickness of about 3.0 $\mu$m, is colored green, blue and red, and is composed of three color filter layers 24G, 24B and 24R transmitting light of green, blue and red color components respectively in a stripe form corresponding to the columns of the pixel electrodes 30.

The pixel electrodes 30 are transparent electrodes of ITO (indium-tin oxide) or the like formed respectively on the color filter layers 24G, 24B and 24R allocated thereto and are connected respectively to the switching elements 14 via through holes 26 in these color layers 24.

Each switching element 14 is connected to a scanning line formed along the row direction of the pixel electrodes 30 and to a signal line formed along the column direction of the pixel electrodes 30, conducts by means of a driving voltage providing from the scanning line, and applies signal voltage to the pixel electrodes.

Figure 1B:
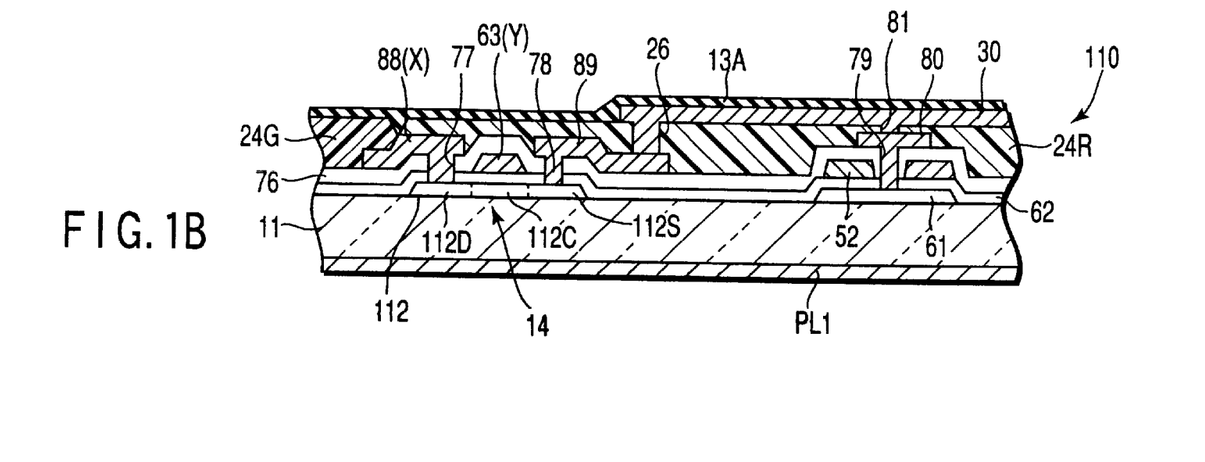
FIG. 1B is a sectional view showing the construction of an array substrate of this liquid crystal display device concretely.

As is clear from the more detailed construction shown in FIG. 1B, the array substrate 110 includes scanning lines Y formed along the rows of the pixel electrodes 30, signal lines X formed along the columns of the pixel electrodes 30, and thin film transistors, that is, TFTs 14, disposed as nonlinear switching elements in the vicinity of the intersecting positions of the scanning lines Y and the signal lines X corresponding to the pixel electrodes 30.

Further, the array substrate 110 is provided with a plurality of storage capacitance elements for forming a storage capacitance CS electrically parallel to the liquid crystal capacitance CL formed by means of the liquid crystal layer 70 between the pixel electrodes 30 and the counter electrodes 22, that is, with a pair of electrodes. That is, the storage capacitance CS is formed by means of a potential difference between storage capacitance electrodes 61 having the same potential as the pixel electrodes 30 and storage capacitance lines 52 set at a predetermined potential.

That is, the signal line X is disposed so as to perpendicularly intersect the scanning line Y and the storage capacitance line 52 via a interlayer insulation film 76. The storage capacitance line 52 is provided in the same layer as the scanning line Y and is formed parallel to the scanning line Y. A part of the storage capacitance line 52 is opposed to the storage capacitance electrode 61 formed of a polysilicon film doped with impurities via a gate insulation film 62.

The wiring portions of these signal line X, scanning line Y and storage capacitance line 52 are formed of a shielding low resistance material such as aluminum or molybdenum-tungsten. In this embodiment, the scanning line Y and the storage capacitance line 52 are formed of molybdenum-tungsten, and the signal line X is formed of mainly aluminum.

TFT 14 includes a semiconductor layer 112 formed of a polysilicon film disposed in the same layer as the storage capacitance electrodes 61. This semiconductor layer 112 includes a drain area 112D and a source area 112S formed by doping the both sides of a channel area 112C with impurities respectively. Further, TFT 14 is provided with a gate electrode 63 united with a scanning line Y opposed to the semiconductor layer 112 via the gate insulation film 62.

The drain electrode 88 of TFT 14 is united with a signal line X and is formed by being connected electrically to the drain area 112D of the semi-conductor layer 112 via a contact hole 77 passing through the gate insulation film 62 and the interlayer insulation film 76. The source electrode 89 of TFT 14 is formed by being connected electrically to the source area 112S of the semiconductor layer 112 via a contact hole 78 passing through the gate insulation film 62 and the interlayer insulation film 76.

On the interlayer insulation film 76 of the array substrate 110, color filter layers 24 (R, G, B) colored red (R), green (G) and blue (B) respectively corresponding to each pixel area are provided. On the color filters 24, pixel electrodes 30 are provided. The pixel electrodes 30 are connected electrically to the source electrode 89 of TFT 14 via a through hole 26.

The storage capacitance electrode 61 is connected electrically to a contact electrode 80 formed of the same material as the signal line X via a contact hole 79 passing through the gate insulation film 62 and the interlayer insulation film 76. The pixel electrodes 30 are connected electrically to the contact electrode 80 via a contact hole 81 passing through the color filter layers 24. In this way, the source electrode 89 of TFT 14, the pixel electrodes 30 and the storage capacitance electrode 61 have the same potential.

As shown in FIG. 1A, the shield pattern SP is composed of a black color layer for shielding light in the shield area 41. Further, each columnar spacer 31 is composed of a black color layer formed in a columnar form for providing a liquid crystal storage space between the array substrate 110 and the counter substrate 120, and is formed of the same material in the same process as the shield pattern SP. For example, the columnar spacers 31 and the shield pattern SP are formed of a photosensitive carbonless black resin containing pigment. In this way, the shield pattern SP and the spacers 31 have a thickness of about 5 $\mu$m.

In the display area 40, the columnar spacers 31 are disposed on each color filter layer 24 (R, G, B) laminated on the shielded wiring portions, for example, on the scanning lines and the storage capacitance line formed of a molybdenum-tungsten alloy film, and on the signal lines formed of aluminum. Further, in the shield area 41, the columnar spacers 31 are disposed on the color filter layers, for example, on the blue colored filter layer 24B. Generally, the distance between the array substrate 110 and the counter substrate 120 depends upon the height of the columnar spacers 31 projecting from the color filter layers 24 (R, G, B).

The alignment film 13A aligns liquid crystal molecules including the liquid crystal layer 70 adjacent to each pixel electrode 30 in a first direction.

The counter substrate 120 includes a transparent substrate 21, a counter electrode 22 formed on this transparent substrate 21, and an alignment film 13B covering this counter electrode 22.

The counter electrode 22 is a transparent electrode formed of ITO or the like disposed so as to be opposed to all the pixel electrodes 30 on the side of the array substrate 110. The alignment film 13B aligns liquid crystal molecules of the liquid crystal layer 70 adjacent to the counter electrode 22 in a second direction offset, for example, by 90 degrees, from the first direction.

Figure 2:
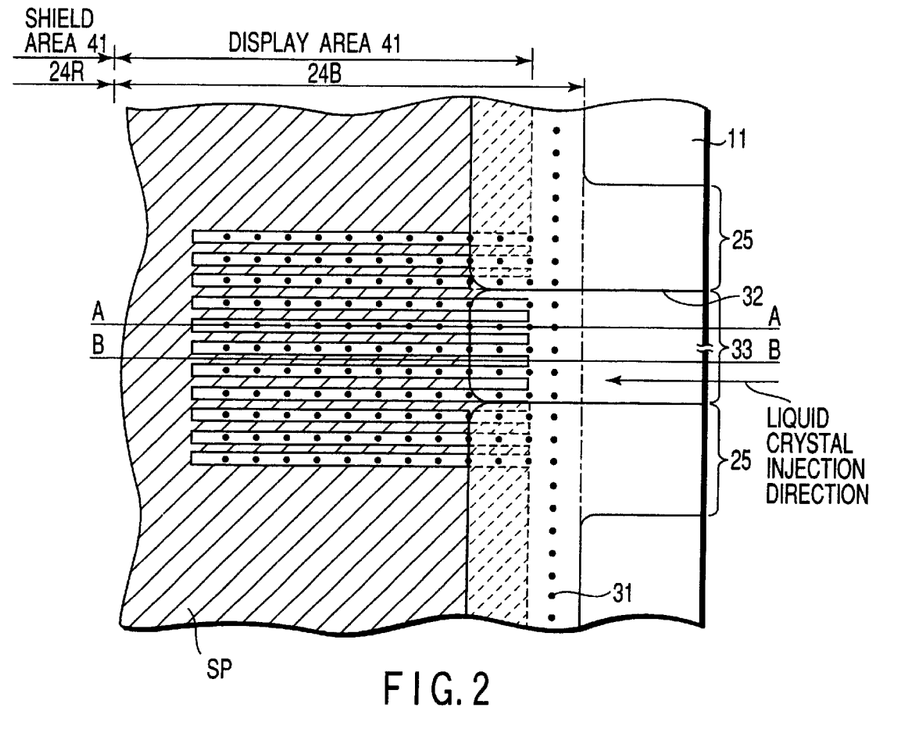
FIG. 2 is a plane view showing to an example of the shield pattern in the vicinity of the liquid crystal inlet of this liquid crystal display device.
Figure 3:
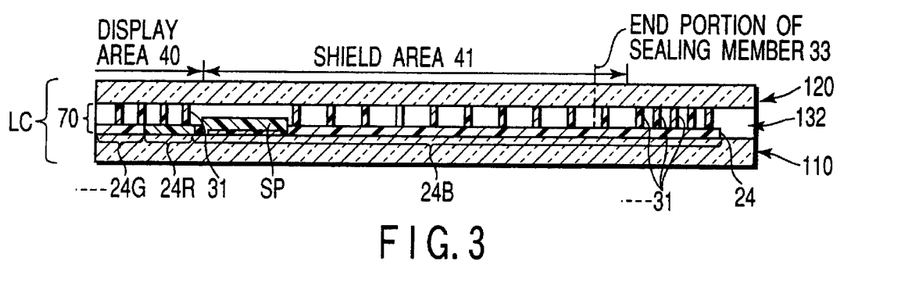
FIG. 3 is a sectional view taken along the line A—A of the liquid crystal display device shown in FIG. 2 and showing the sectional construction in the vicinity of the liquid crystal inlet where the color filter is not covered with the shield pattern.
Figure 4:
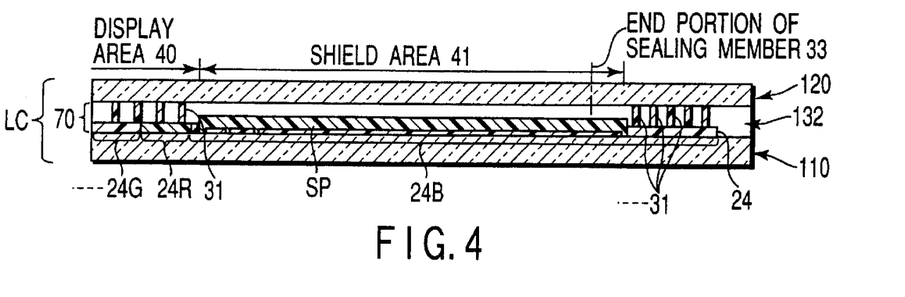
FIG. 4 is a sectional view taken along the line B—B of the liquid crystal display device shown in FIG. 2 and showing the sectional construction in the vicinity of the liquid crystal inlet where the color filter is not covered with the shield pattern.

The liquid crystal cell LC includes an outer edge sealing member 25 which is formed along the outer periphery of the shield area 41 so as to leave a liquid crystal inlet 32 (with a width of about 20 mm) shown in FIGS. 2 to 4 and bonds the outer edges of the array substrate 110 and the counter substrate 120, a liquid crystal material LQ injected through the liquid crystal inlet 32 into the liquid crystal storage space, and an inlet sealing member 33 sealing the liquid crystal inlet 32 for holding the liquid crystal material LQ in the liquid crystal storage space.

Moreover, as shown in FIG. 2, the shield pattern SP is formed in a stripe form exposing the color filter 24 selectively in the vicinity of the liquid crystal inlet 32 of the shield area for expanding the liquid crystal injection path (concretely the cross section of the liquid crystal inlet in the liquid crystal cell LC).

Now, the manufacturing method of said liquid crystal display device will be described.

In the manufacturing process of the array substrate 110, filming and patterning are repeated first on a 0.7 mm thick glass substrate 11, thereby forming scanning lines Y, signal lines X, and switching elements having a semiconductor layer 112 formed of polysilicon film.

That is, first, on the glass substrate 11, an amorphous silicon film, that is, an a-Si film is formed by means of CVD method or the like. After having annealed and dehydrogenated this amorphous silicon film, an eximer laser beam is irradiated, thereby polycrystallizing the a-Si film. Subsequently, the polycrystallized silicon film, that is, the polysilicon film 112 is patterned by means of photoengraving process, thereby forming not only a channel layer of TFT 14 provided respectively in each pixel area, but also a storage capacitance electrode 61 in the display area.

Next, by means of CVD method, a silicon oxide film, that is, a SiOx film is formed on the whole surface of the substrate 11, thereby obtaining a gate insulation film 62.

Next, on the whole surface of the gate insulation film 62, a single substance film, a laminated film or an alloy film of tantalum (Ta), chromium (Cr), aluminum (Al), molybdenum (Mo), tungsten (W) and copper (Cu) is formed (in this embodiment, Mo—W alloy film) and patterned in a predetermined form by means of photoengraving process. In this way, various wirings such as a scanning line Y, a storage capacitance line 52 opposed to the storage capacitance electrode 61 via the gate insulation film 62, and a gate electrode 63 of TFT 75 united with the scanning line Y are formed.

Next, with using the gate electrode 63 as a mask, impurities are injected into the polysilicon film 112 by means of ion injection method or ion doping method. In this way, the drain area 112D and the source area 112S of TFT 14 are formed. The whole substrate is annealed, thereby activating the impurities.

Next, a silicon dioxide film, that is, a $SiO_2$ film is formed on the whole surface of the substrate 11, thereby obtaining an interlayer insulation film 76.

Next, by means of photoengraving method, a contact hole 77 extending through the gate insulation film 62 and the interlayer insulation film 76 to the drain area 112D of TFT 14, a contact hole 78 extending to the source area 112S thereof, and a contact hole 79 extending to the storage capacitance electrode 61 are formed.

Next, a single substance film, a laminated film or an alloy film of Ta, Cr, Al, Mo, W and Cu is formed (in this embodiment, Al film) and patterned in a predetermined form by means of photoengraving process.

In this way, not only a signal line X, but also a drain electrode 79 of TFT 14 united with the signal line X is formed. Simultaneously, a source electrode 89 of TFT 14 and a contact electrode 80 coming into contact with the storage capacitance electrode 61 are formed.

Next, an ultraviolet ray-hardening acrylic resin resist in which a red pigment is dispersed is applied on the whole surface of the substrate by means of a spinner. This resist film is prebaked, for example, at a temperature of 90° C. for five minutes, and light with a wavelength of 365 nm is irradiated in a quantity of 150 mJ/cm$^2$ via a photomask enabling light to be irradiated to the portions corresponding to the red pixels. This photomask includes a circular pattern with a diameter of 15 $\mu$m for forming a through hole 26 and a stripe pattern, for forming a red color filter layer 24R. Subsequently, this resist film is developed for about 60 seconds by means of a predetermined developer, and after washing with water, it is postbaked, for example, at a temperature of 200° C. for about an hour. And the through hole 26 is formed together with the red color filter layer 24R.

Next, by repeating a similar process, the green color filter layer 24G and the blue color filter layer 24B are formed, and they are postbaked respectively, for example, at a temperature of 200° C. for about an hour. Here, the blue color filter layer 24B is patterned so as to remain in a stripe form in an area becoming the liquid crystal inlet 32. The films of the color filter layers (R, G, B) have a thickness of about 3 $\mu$m respectively.

In this forming process of the color filter layers 24, a through hole 26 bringing the switching elements 14 and the pixel electrodes 30 into contact with each other is formed simultaneously. Further, a through hole 81 bringing the pixel electrodes 30 and the contact electrode 80 into contact with each other is also formed simultaneously.

Next, by forming ITO films on the color filter layers 24 by means of spattering method and by patterning them into predetermined pixel patterns, pixel electrodes 30 being in contact with the switching elements 14 are formed.

Next, a photosensitive carbonless black resin containing pigment particles with a diameter of 0.05 to 0.2 $\mu$m is applied in a thickness of about 6 $\mu$m on this substrate surface by means of a spinner.

And, after being dried at a temperature of 90° C. for ten minutes, this black resin is patterned so as to remain between the stripes of the color filter layer 24B on the color filter layers 24, on the pixel electrodes 30, and in the vicinity of the liquid crystal inlet 32. That is, this black resin is exposed at a wavelength of 365 nm and in an exposure value of 500 mJ/cm$^2$ by means of a photomask having a predetermined pattern form. And, by developing it in an alkaline aqueous solution of pH 11.5, a columnar form is formed.

And, by raising the temperature to 220° C. at a temperature raising rate of 200° C./min, the columns are hot-treated. That is, by melting the columns and further maintaining this temperature for 60 minutes, the columns are hardened completely. When hardening the columns, for example, by controlling the temperature raising rate, the meltability of the columns can be controlled.

In this way, shielding columnar spacers 31 with a height of about 5 $\mu$m are formed not on the pixel electrodes 30, but on predetermined positions on the color filter layers 24. Further, a shield pattern SP of about 5 $\mu$m is formed so as to cover the shield area 41 outside the display area 40 in a frame form and so as to expose the color filter layer 24B in the vicinity of the liquid crystal inlet 32.

Concretely, the color filter layer 24B is exposed by forming the shield pattern SP in a stripe form between the color filter layers 24B in a stripe form. Here, the stripes of the shield pattern SP are set, as shown in FIG. 2, in a direction making it easy to inject a liquid crystal material LQ. In this way, black and blue two-color stripes are formed in the vicinity of the liquid crystal inlet 32.

Next, after having applied an alignment film material in a film thickness of 500 angstrom on the whole surface of the substrate and having fired it, a rubbing treatment is given, thereby forming an alignment film 13A.

In this way, the array substrate 110 is finished.

On the other hand, in the manufacturing process of the counter substrate 120, first of all, ITO is accumulated in a thickness of about 100 nm on a 0.7 mm thick glass substrate 21 by means of spattering method and is patterned, thereby forming a counter electrode 22. An alignment film material is applied on the whole surface of the transparent substrate 21 with the counter electrode being covered, and an alignment treatment is given after firing, thereby forming an alignment film 13B.

In this way, the counter substrate 120 is finished.

In the manufacturing process of the liquid crystal cell LC, an outer edge sealing member 25 is applied on the outer periphery of the array substrate 110 so as to surround the liquid crystal storage space with leaving the liquid crystal inlet 32, and the outer edge of the array substrate 110 and the outer edge of the counter substrate 120 are bonded to each other. The outer edge sealing member 25 is, for example, a thermohardening epoxy adhesive.

Next, the liquid crystal material LQ is injected in a vacuum state through the liquid crystal inlet 32 into the liquid crystal storage space, and further, the liquid crystal inlet 32 is sealed by means of an inlet sealing member 33 which is a ultraviolet ray-hardening resin. The liquid crystal material LQ is composed of nematic liquid crystals to which a kyral material is added.

After the liquid crystal cell LC has been finished in this way, two polarizing plates PL1 and PL2 are stuck on the array substrate 110 and the counter substrate 120 on the opposite side with respect to the liquid crystal cell LC.

By means of the manufacturing method as described above, a liquid crystal display device is formed.

According to this liquid crystal display device, the liquid crystal injection time of 270 minutes required when the shield pattern SP is not formed in a stripe form in the vicinity of the inlet is shortened to 120 minutes. Further, when two-color stripes of black and blue are formed by exposing the blue color filter layer 24B selectively, an improved appearance is obtained in comparison to the case in which the shield pattern SP is removed completely in the vicinity of the liquid crystal inlet 32 and only the totally blue color filter layer 24B is used.

Moreover, the present invention is not limited to the above-described embodiment and various modifications are possible. For example, with respect to the shield pattern SP, by combining various stripes, gradations and mosaics with each other and by changing the pitches and the directions thereof in order to obtain similar effects, any forms can be used.

In the shield pattern shown in FIG. 2, the width and the interval of the stripes are set to 200 $\mu$m, respectively, however, they can be changed freely, for example, to 100 $\mu$m or 50 $\mu$m.

Figure 5:
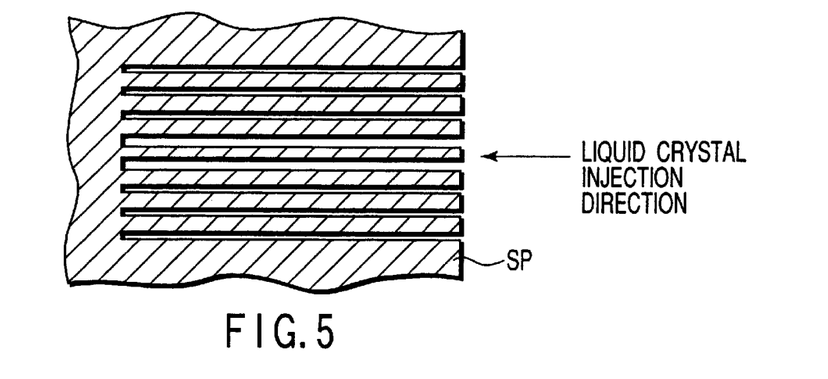
FIG. 5 is a plane view showing a first modification of the shield pattern in the vicinity of the liquid crystal inlet shown in FIG. 2.
Figure 6:
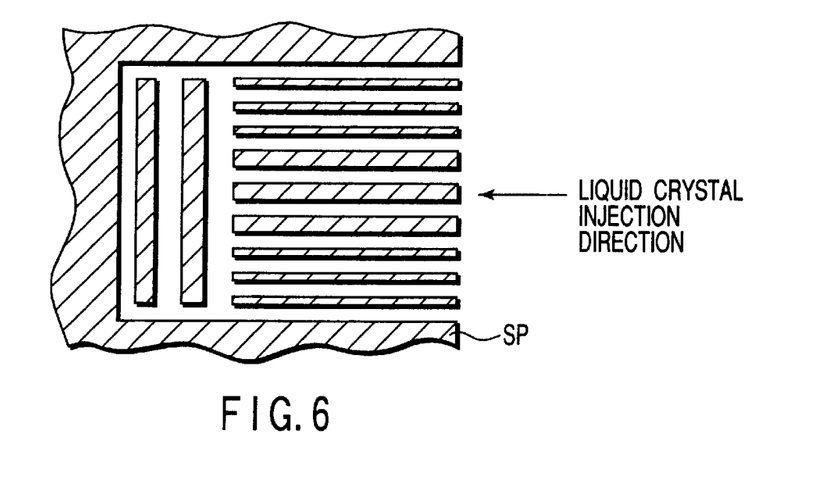
FIG. 6 is a plane view showing a second modification of the shield pattern in the vicinity of the liquid crystal inlet shown in FIG. 2.

Further, as shown in FIGS. 5 and 6, the shield pattern SP may be formed by applying a gradation to the stripe arrangements substantially parallel to the liquid injection direction. Also in this case, the injection of liquid crystal can be completed in about 120 minutes similarly as in the above-described embodiment. Further, by means of this gradation, the blue color can be made less quite than the shield pattern SP shown in FIG. 2, thereby improving the appearance further.

Figure 7:
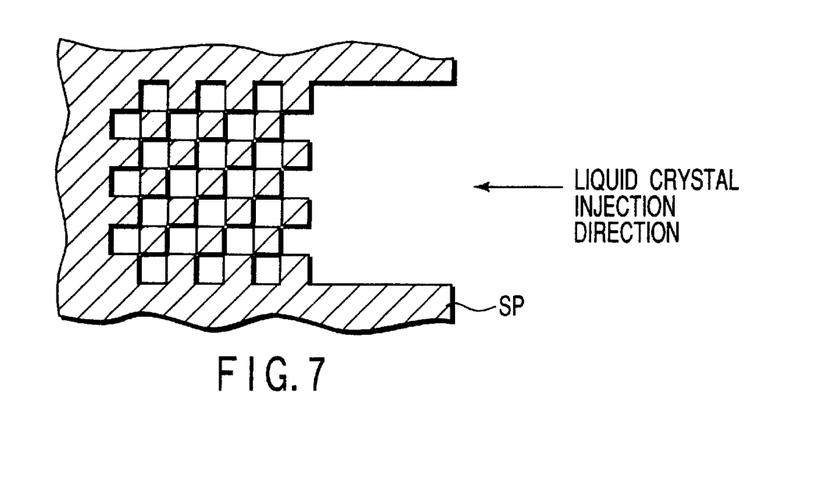
FIG. 7 is a plane view showing a third modification of the shield pattern in the vicinity of the liquid crystal inlet shown in FIG. 2.

Further, as shown in FIG. 7, the shield pattern SP may be formed in a mosaic form. The mosaic size can be set freely, for example, to 100 μm×100 μm or 500 μm×500 μm. Also in this case, the injection of liquid crystal can be completed in about 120 minutes similarly as in the above-described embodiment. Further, also in this mosaic pattern, the blue color can be made less quiet, thereby improving the appearance further.

Now, the first outer periphery wiring L1 includes various elements such as protection diodes displaced in the shield area 41 so as to surround the display area 40, and is covered with the shield pattern SP shielding the shield area 41 and the color filter layer 24. The second outer periphery wiring L2 is disposed on the outer periphery of the outer edge sealing member 25. This second outer periphery wiring 22 functions as a transfer wiring for transmitting electricity to the counter electrode or as a guard wiring for a measure to counter static electricity.

Figure 8A:
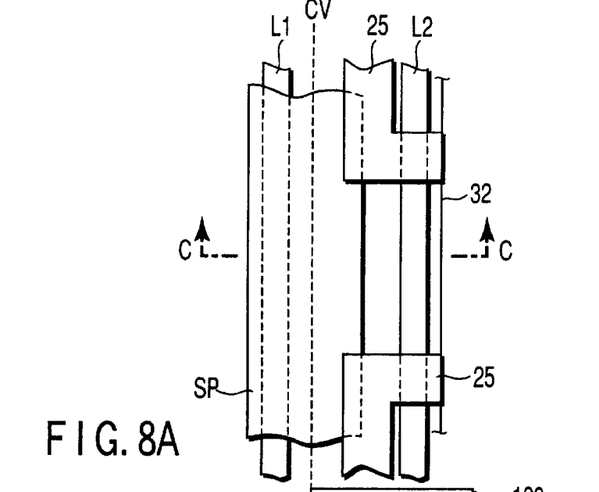
FIG. 8A is a plane view showing a fourth modification of the shield pattern in the vicinity of the liquid crystal inlet shown in FIG. 2.
Figures 8B, 9A:
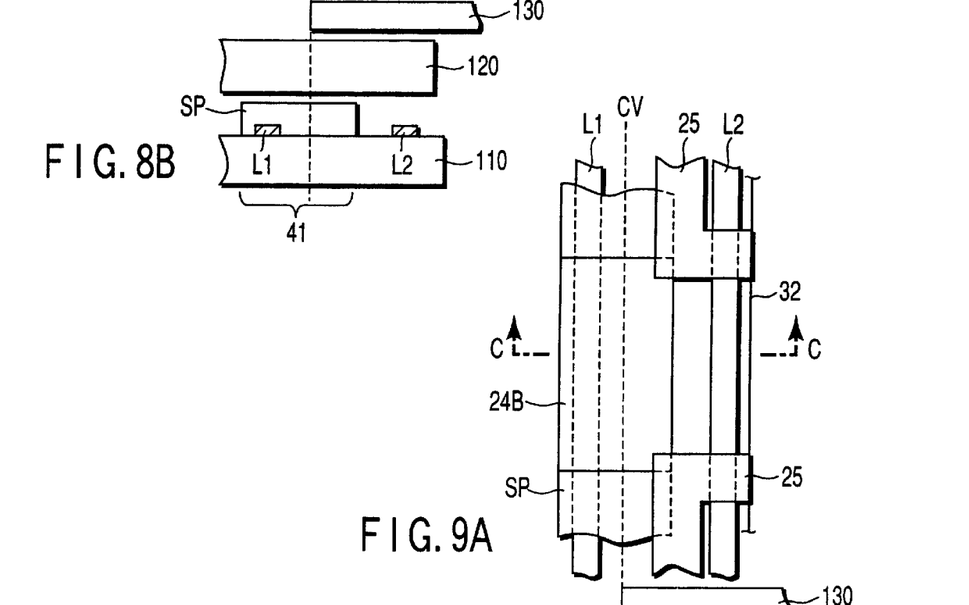
FIG. 8B is a sectional view taken along the line C—C of FIG. 8A.
FIG. 9A is a plane view showing a fifth modification of the shield pattern in the vicinity of the liquid crystal inlet shown in FIG. 2.

In such a configuration, as shown in FIGS. 8A and 8B, when the shield area 41 in the vicinity of the liquid crystal inlet 32 is formed of only the shield pattern SP, the shield pattern SP is relatively thick, and therefore, the opening of the liquid crystal inlet 32 has a small cross-sectional area and the injection of liquid crystal cannot be completed in a short time.

Figure 9B:
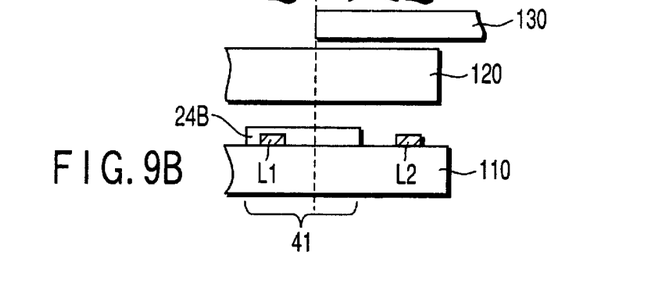
FIG. 9B is a sectional view taken along the line C—C of FIG. 9A.

Further, as shown in FIGS. 9A and 9B, when the shield area 41 in the vicinity of the liquid crystal inlet 32 is formed of only the blue color filter layer 24B, the color filter layer 24B is thinner than the shield pattern SP, and therefore, the opening of the liquid crystal inlet 32 can be expanded and the injection of liquid crystal can be completed in a short time. However, in the shield area 41 situated nearer to the side of the display area than the end portion CV covered with a cover 130, blue light is observed and the appearance is deteriorated.

For this reason, as in the above-described embodiment, at least the shield area 41 situated nearer to the side of the display area than the end portion CV of the cover 130 can shorten the liquid crystal injection time and improve the appearance by forming a pattern combining various stripes, gradations and mosaics with each other by means of the shield pattern SP and the color filter layer 24B.

Figure 10A:
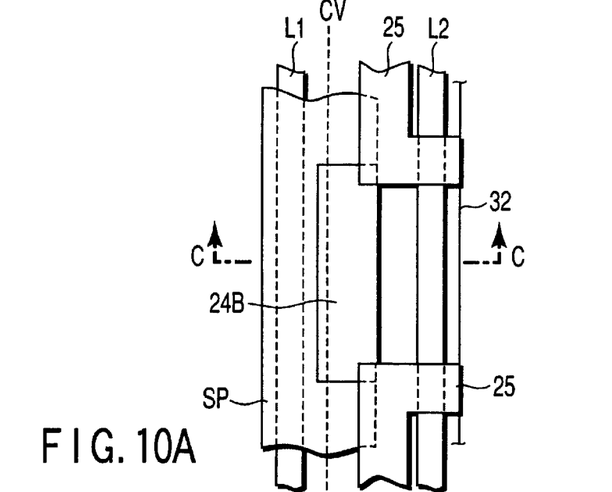
FIG. 10A is a plane view showing a sixth modification of the shield pattern in the vicinity of the liquid crystal inlet shown in FIG. 2.
Figures 10B, 11A:
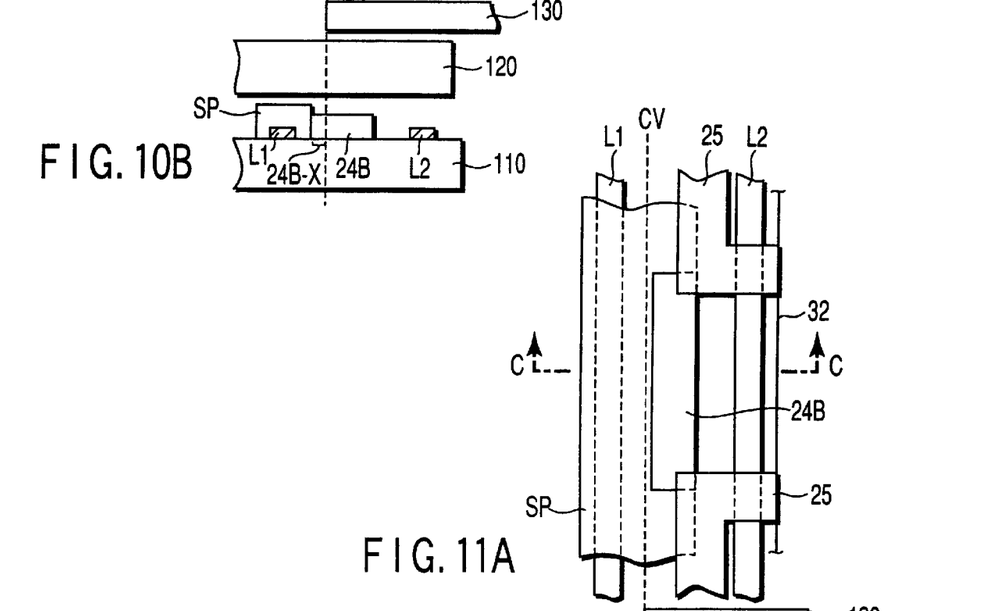
FIG. 10B is a sectional view taken along the line C—C of FIG. 10A.
FIG. 11A is a plane view showing a seventh modification of the shield pattern in the vicinity of the liquid crystal inlet shown in FIG. 2.

Next, as shown in FIGS. 10A and 10B, a case in which the shield area 41 in the vicinity of the liquid crystal inlet 32 is formed of the shield pattern SP and the blue color filter layer 24B will be described. The shield pattern SP is disposed so as to cover at least the first outer periphery wiring L1 in the shield area 41, and the color filter layer 24B is disposed on the side of the outer periphery in the shield area 41, that is, on the side of the second outer periphery wiring L2. In this example, the width of the color filter layer 24B is about 60% of the overall width of the shield area.

In such an arrangement, since the color filter layer 24B disposed at the liquid crystal inlet 32 is thinner than the shield pattern SP disposed on the side of the display area, the cross-sectional area of the opening of the liquid crystal inlet 32 can be expanded substantially, and although the liquid crystal injection time is a little longer than in an example shown in FIGS. 9A and 9B, the injection of liquid crystal can be completed in shorter time than in an example shown in FIGS. 8A and 8B. However, in the shield area 41 situated nearer to the side of the display area than the end portion CV of the cover 130, blue light is observed and the appearance is deteriorated due to an area 24B-X in which a portion of the color filter layer 24B is exposed.

For this reason, as in the above-described embodiment, at least in the area 24B-X situated nearer to the side of the display area than the end portion CV of the cover 130 can shorten the liquid crystal injection time and improve the appearance by forming a pattern combining various stripes, gradations and mosaics with each other by means of the shield pattern SP and the color filter layer 24B.

Figure 11B:
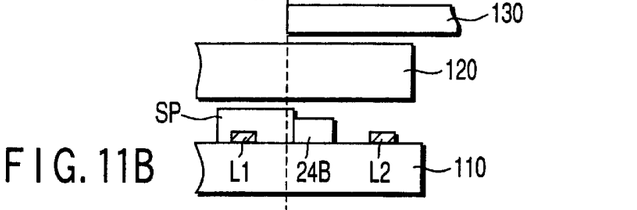
FIG. 11B is a sectional view taken along the line C—C of FIG. 11A.

Next, as shown in FIGS. 11A and 11B, a case in which the shield area 41 in the vicinity of the liquid crystal inlet 32 is formed of the shield pattern SP and the blue color filter layer 24B will be described. The shield pattern SP is disposed so as to cover at least the first outer periphery wiring L1 in the shield area 41, and the color filter layer 24B is disposed on the side of the outer periphery in the shield area 41, that is, on the side of the second outer periphery wiring L2. In this example, the width of the color filter layer 24B is about 30% of the overall width of the shield area.

In such an arrangement, since the color filter layer 24B disposed at the liquid crystal inlet 32 is thinner than the shield pattern SP disposed on the side of the display area, the cross-sectional area of the opening of the liquid crystal inlet 32 can be expanded substantially, and although the liquid crystal injection time is a little longer than in an example shown in FIGS. 10A and 10B, the injection of liquid crystal can be completed in shorter time than in an example shown in FIGS. 8A and 8B. Moreover, in the shield area 41 situated nearer to the side of the display area than the end portion CV of the cover 130, light is shielded by means of the shield pattern SP, and therefore, the deterioration of the appearance can be prevented.

In the above-described embodiment, since the shield pattern SP is patterned in the same process as the columnar spacers 31 and the blue color filter layer 24B is patterned in the same process as the color filters in the display area 40, the liquid crystal injection time can be shortened without increasing the number of the manufacturing processes, and the appearance in the vicinity of the liquid crystal inlet can be improved.

Now, a liquid crystal display device according to a second embodiment of the present invention will be described. Further, since this liquid crystal display device has the same construction as the above-described first embodiment except for the structure in the vicinity of the liquid crystal inlet, a detailed description will be omitted.

In the above-described embodiment, the vicinity of the liquid crystal inlet 32 is shielded by means of the shield pattern SP and the color filter 24, however, it may be shielded by means of shielding metallic films composing the first outer periphery wiring L1 and the second outer periphery wiring L2.

That is, these outer periphery wirings L1 and L2 are composed of first metallic films M1-1 and M1-2 and second metallic films M2-1 and M2-2 respectively. The first metallic films M1-1 and M1-2 are made of the same material and are pattered in the same process as the scanning lines Y and the storage capacitance line 52, and the second metallic films M2-1 and M2-2 are made of the same material and are pattered in the same process as the signal lines X. Here, the first metallic films are molybdenum-tungsten alloy films, and the second metallic films are aluminum films.

Figure 12A:
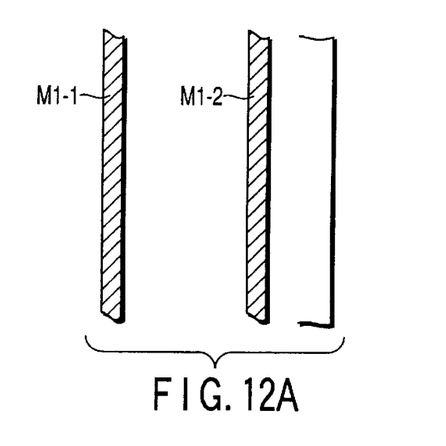
FIGS. 12A to 12C are views showing the manufacturing process for forming the shield pattern in the vicinity of the liquid crystal inlet of a liquid crystal display device according to a second embodiment of the present invention.

In the liquid crystal display device according to the second embodiment, as shown in FIG. 12A, by patterning the first metallic film M1 after being. formed, metallic films M1-1 and M1-2 are formed at a predetermined distance from each other so as to correspond to the first outer periphery wiring L1 and the second outer periphery wiring L2 respectively. Here, the first metallic films M1-1 and M1-2 are disposed at a distance sufficient to prevent static electricity from reaching them, for example, at a distance of no less than 1500 µm.

Figure 12B:
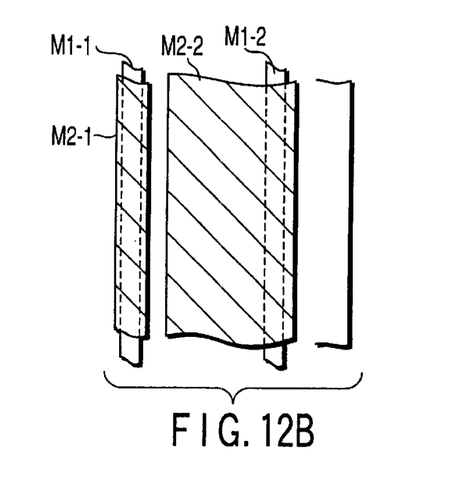

Next, as shown in FIG. 12B, by patterning the second metallic film M2 after being formed, metallic films M2-1 and M2-2 are formed at a predetermined distance from each other so as to correspond to the first outer periphery wiring L1 and the second outer periphery wiring L2 respectively. In this way, as the first outer periphery wiring L1, a wiring including various elements including a protection diode is formed. Further, the second outer periphery wiring L2 is formed of the first metallic film M1-2 and the second metallic film M2-2 connected electrically to each other. These second metallic films M2-1 and M2-2 are disposed at a shorter distance than in patterning the first metallic films M1-1 and M1-2, however, even if static electricity is generated, the protection diode included in the first outer periphery wiring L1 prevents other elements from being affected.

Figure 12C:
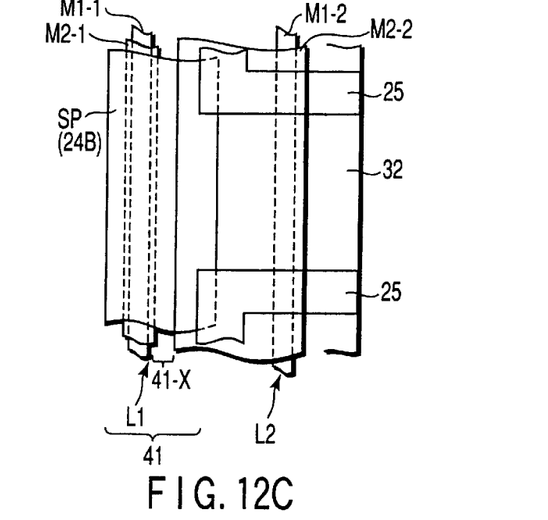

Next, as shown in FIG. 12C, at least the shield pattern SP is disposed so as to cover at least an area 41-X between the first outer periphery wiring L1 and the second outer periphery wiring L2 and a shield area 41 on the side of the pixel area. Further, along the outer periphery of the shield area 41 an outer edge sealing member 25 is provided, thereby defining the liquid crystal inlet 32. Moreover, by not only using the shield pattern SP, but by combining the shield pattern SP and the color filter layer as described above with each other, the shield area 41 in the vicinity of the liquid crystal inlet 32 can form a pattern combining various stripes, gradations and mosaics with each other and shorten the liquid crystal injection time with improving the appearance.

According to the embodiment as described above, by using the metallic film forming the wiring portion, the shield area can be shielded without increasing the number of the manufacturing processes.

Now, a modification according to the second embodiment of the present invention will be described.

Figure 13A:
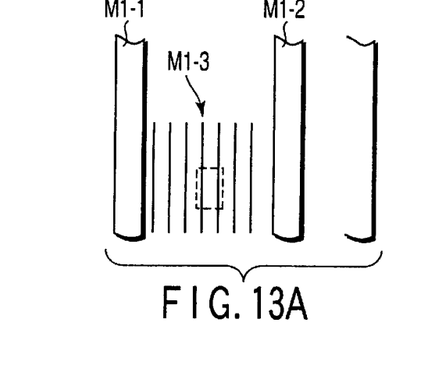
FIG. 13A is a view showing the manufacturing process for forming the shield pattern in the vicinity of the liquid crystal inlet of a liquid crystal display device according to a modification of the second embodiment.
Figure 13B:
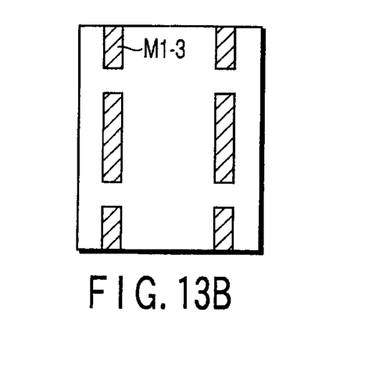
FIG. 13B is an enlarged plane view enlarging an area shown by means of a broken line in FIG. 13A.

That is, as shown in FIGS. 13A and 13B, by patterning the first metallic film M1 after being formed, metallic films M1-1 and M1-2 are formed at a predetermined distance from each other so as to correspond to the first outer periphery wiring L1 and the second outer periphery wiring L2 respectively. Further, simultaneously in an area between the first outer periphery wiring L1 and the second outer periphery wiring L2, the first metallic film M1 in the vicinity of the liquid crystal inlet 32 is patterned in a stripe form in a direction perpendicularly intersecting the liquid crystal injection direction, that is, in a direction parallel to the outer periphery wiring, thereby forming metallic films M1-3. As shown in FIG. 13B, the metallic films M1-3 have a width of about 10 µm and have a length of about 190 µm in the column direction. Moreover, the metallic films M1-3 are disposed at a distance of about 10 µm in the column direction, and are disposed at a distance of about 190 µm in the row direction.

Figure 14A:
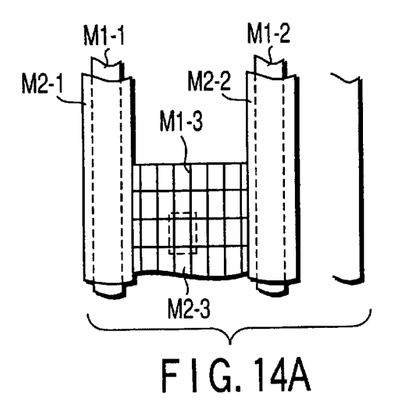
FIG. 14A is a view showing the manufacturing process for forming the shield pattern in the vicinity of the liquid crystal inlet of a liquid crystal display device according to a modification of the second embodiment.
Figure 14B:
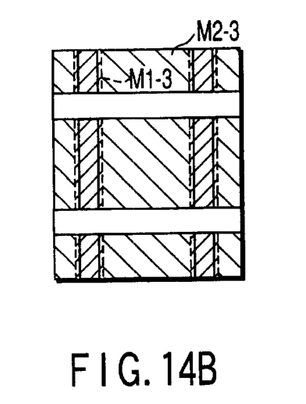
FIG. 14B is an enlarged plane view enlarging an area shown by means of a broken line in FIG. 14A.

Next, as shown in FIGS. 14A and 14B, by patterning the second metallic film M2 after being formed, metallic films M2-1 and M2-2 are formed at a predetermined distance from each other so as to correspond to the first outer periphery wiring L1 and the second outer periphery wiring L2 respectively. Further, simultaneously in an area between the first outer periphery wiring L1 and the second outer periphery wiring L2, the second metallic film M2 in the vicinity of the liquid crystal inlet 32 is patterned in a matrix form, thereby forming metallic films M2-3. As shown in FIG. 14B, the metallic films M2-3 have a length of about 194 µm in the row direction and a length of about 190 µm in the column direction. Moreover, the metallic films M2-3 are disposed at a distance of about 10 µm in the column direction, and are disposed at a distance of about 6 µm in the row direction.

In this way, as the first outer periphery wiring L1, a wiring including various elements including a protection diode is formed. Further, the second outer periphery wiring L2 is formed of the first metallic film M1-2 and the second metallic film M2-2 connected electrically to each other.

Figure 15A:
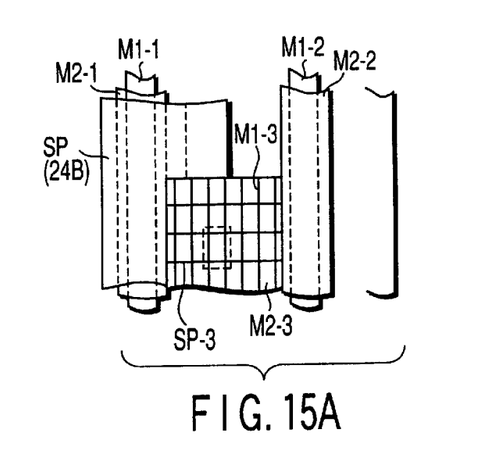
FIG. 15A is a view showing the manufacturing process for forming the shield pattern in the vicinity of the liquid crystal inlet of a liquid crystal display device according to a modification of the second embodiment.
Figure 15B:
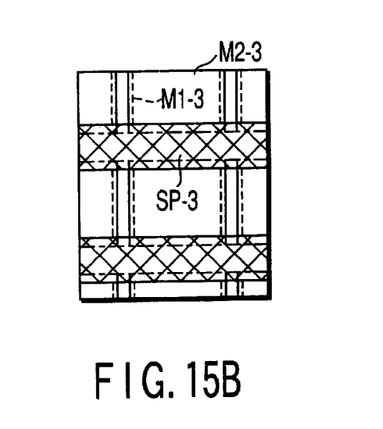
FIG. 15B is an enlarged plane view enlarging an area shown by means of a broken line in FIG. 15A.

Next, as shown in FIGS. 15A and 15B, by patterning the black resin film after being formed, at least the shield pattern SP is disposed so as to cover at least an area between the first outer periphery wiring L1 and the second outer periphery wiring L2 and a shield area on the side of the display area. Further, simultaneously in an area between the first outer periphery wiring L1 and the second outer periphery wiring L2, the black resin film in the vicinity of the liquid crystal inlet 32 is patterned in a stripe form in a direction parallel to the liquid crystal injection direction, that is, in a direction perpendicularly intersecting the outer periphery wiring, thereby forming a shield pattern SP-3. As shown in FIG. 15B, the shield pattern SP-3 has a width of at least not less than 10 µm.

Figure 16:
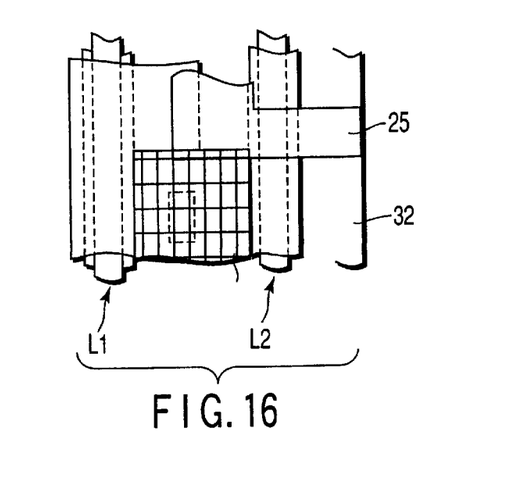
FIG. 16 is a view showing the manufacturing process for forming the shield pattern in the vicinity of the liquid crystal inlet of a liquid crystal display device according to a modification of the second embodiment.

Next, as shown in FIG. 16, an outer edge sealing member 25 is provided along the outer periphery of the shield area 41, thereby defining the liquid crystal inlet 32.

In this way, in the vicinity of the liquid crystal inlet 32, the row direction of the second metallic films M2-3 having a matrix form is shielded by means of the shield pattern SP-3, and the column direction thereof is shielded by means of the first metallic films M1-3.

According to the embodiment as described above, by using the metallic films forming the first outer periphery wiring L1 and the second outer periphery wiring L2 and the black resin forming the shield pattern SP, the shield area can be shielded without increasing the number of the manufacturing processes. Moreover, by shielding the shield area in the vicinity of the liquid crystal inlet 32 by means of the first and second metallic films M1 and M2 having a relatively small thickness, the liquid crystal injection time can be shortened in comparison with an case in which the shield area is formed of only a black resin having a relatively large thickness.

Now, in the embodiment described above, the color filter layer 24 is composed of a blue color filter layer 24B in the shield area 41 in the vicinity of the liquid crystal inlet 32 in order to obtain a combination of blue and black, however, this color filter layer may be replaced with a filter layer having another color similar to the black of the shield pattern SP.

Further, in the embodiment described above, the shield pattern SP and the color filter 24 are formed on the side of the array substrate 110, however, these may be formed on the side of the counter substrate 120.

As described above, according to the present invention, there can be provided a liquid crystal display device being capable of shortening the liquid crystal injection time without deteriorating the appearance in the vicinity of the liquid crystal inlet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device provided with a pair of substrates, a liquid crystal material sandwiched between said pair of substrates, a shield area disposed on the outer periphery of a display area, and an outer edge sealing member disposed on the further outer periphery than said shield area and formed except for the liquid crystal inlet comprising:

a first outer periphery wiring disposed on the outer periphery of said display area; and a second outer periphery wiring disposed on the further outer periphery than said shield area, wherein said first outer periphery wiring and said second outer periphery wiring are composed of at least two kinds of first metallic films and second metallic films respectively, and wherein said shield area in the vicinity of said inlet is shielded by means of a shield pattern formed of a resin having a predetermined thickness and by means of at least said second outer periphery wiring.

2. The liquid crystal display device according to claim 1, wherein said first outer periphery wiring and said second outer periphery wiring are formed by patterning said first metallic films at a predetermined distance in two columns, and by patterning said second metallic films at a smaller distance than said predetermined distance in two columns so as to cover said first metallic films.

3. The liquid crystal display device according to claim 1, wherein the gaps of said second metallic films in the row direction and in the column direction are shielded by means of said first metallic films and said shield pattern by patterning said first metallic films in a stripe form substantially perpendicularly intersecting the liquid crystal injection direction, by patterning said second metallic films in a matrix form, and by patterning said shield pattern in a stripe form substantially parallel to the liquid crystal injection direction in the vicinity of said inlet.

4. The liquid crystal display device according to claim 1, wherein at least one substrate of said pair of substrates is provided with scanning lines arranged in a row direction, signal lines arranged in a column direction, switching elements disposed in the vicinity of the intersections of said scanning lines and said signal lines, and pixel electrodes connected to said switching elements, wherein said first metallic films are formed of the same material and are patterned in the same process as said scanning lines, and wherein said second metallic films are formed of the same material and are patterned in the same process as said signal lines.

* * * * *

UNITED STATES PATENT AND TRADEMARK OFFICE
CERTIFICATE OF CORRECTION

PATENT NO.    : 6,674,500 B2
DATED         : January 6, 2004
INVENTOR(S)   : Atsuyuki Manabe et al.

It is certified that error appears in the above-identified patent and that said Letters Patent is hereby corrected as shown below:

<u>Title page,</u>
Item [54], Title, "LIQUID CRYSTAL DISPLAY DEVICE WHEREIN LIQUID CRYSTAL INLET SHIELDED BY MEANS OF SHIELD PATTERN AND SECOND OUTER PERIPHERY WIRING" with -- LIQUID CRYSTAL DISPLAY DEVICE --

Signed and Sealed this

Twenty-fourth Day of August, 2004

JON W. DUDAS
*Director of the United States Patent and Trademark Office*